May 22, 1962     E. F. BEATTY     3,035,870
RATIO CHANGING MEANS FOR FLUID ACTUATED BRAKES
Filed March 27, 1961
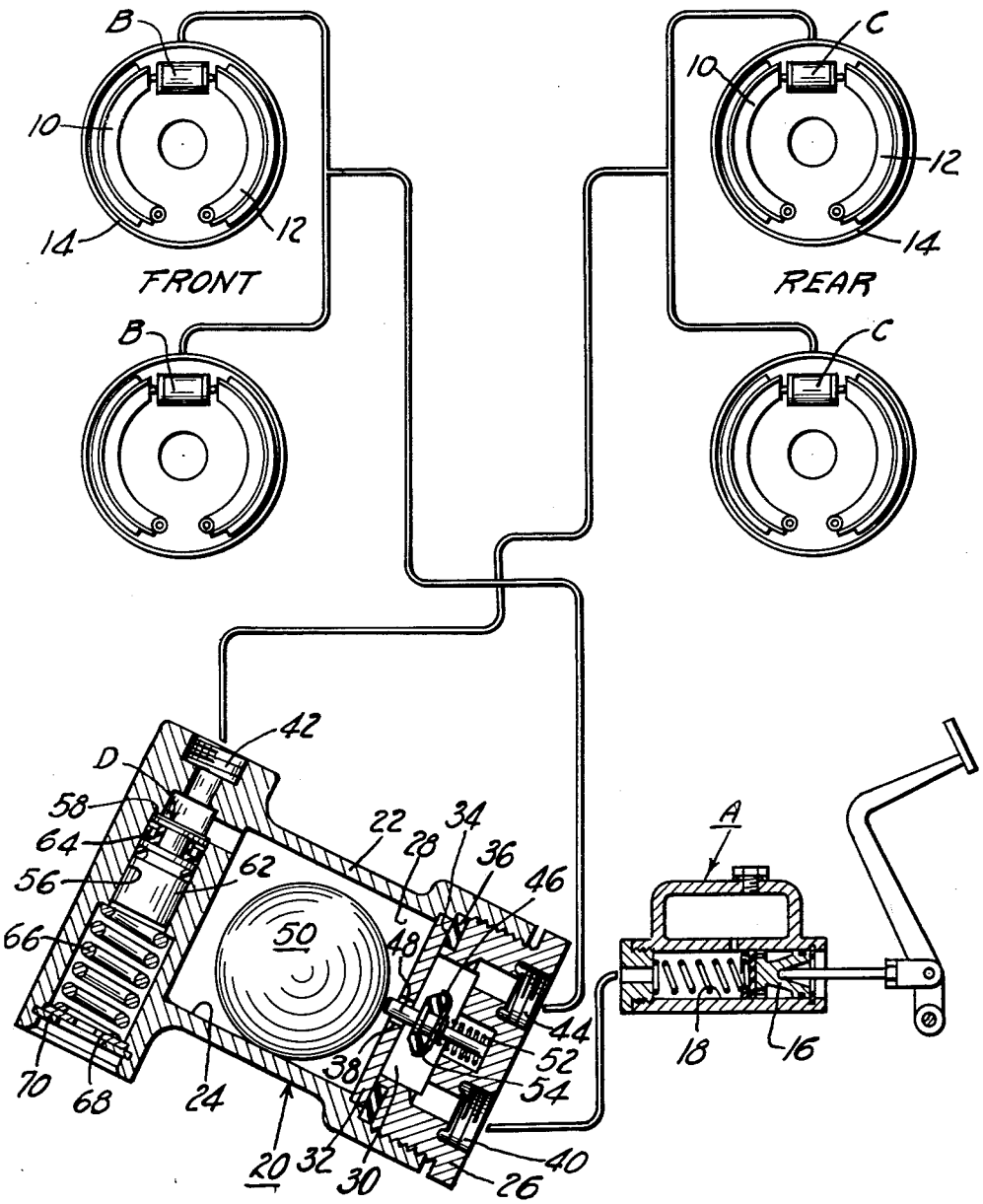
INVENTOR.
EUGENE F. BEATTY
BY
William P. Hickey
ATTORNEY

United States Patent Office 3,035,870
Patented May 22, 1962

3,035,870
RATIO CHANGING MEANS FOR FLUID
ACTUATED BRAKES
Eugene F. Beatty, South Bend, Ind., assignor to The Bendix Corporation, South Bend, Ind., a corporation of Delaware
Filed Mar. 27, 1961, Ser. No. 98,382
4 Claims. (Cl. 303—6)

The present invention relates to fluid pressure braking systems of automotive vehicles wherein the pressure to either the front or rear wheel brakes is limited when the vehicle reaches a certain predetermined deceleration; more particularly to an improved deceleration valve to be used in such systems.

During the deceleration of automotive vehicles, there is a gradual shift in weight towards the front of the vehicle which varies proportionally to the vehicle's deceleration. The amount of braking that can be produced by the rear wheels of the vehicle, therefore, decreases as the rate of deceleration of the vehicle increases. It is a property of hydraulic braking systems generally that the amount of braking which is achieved at any of its wheels is generally proportional to the hydraulic pressure used to actuate the brake applying wheel cylinders; so that the amount of braking which is done by the rear wheels generally increases as the hydraulic pressure increases to the rear brake applying cylinders. When the braking torque which is developed by the rear wheel brakes exceeds the frictional force between the tire and the road surface, sliding occurs; and it is a well known fact that once sliding occurs, the coefficient of friction between the wheel and road surface decreases appreciably. In order that the operator can maintain control of the vehicle at all times and the rear wheels can contribute their maximum braking effort to the vehicle it is necessary that the rear wheels be kept from sliding at all times.

An object of the present invention is therefore the provision of a new and improved split hydraulic braking system in which the hydraulic pressure to the rear wheel brakes is kept at a value below that which will produce a sliding of the rear wheel; so that the rear wheels can contribute their maximum braking effort to the deceleration of the vehicle at all times.

It has been found that it is highly impractical to modulate the pressure to the rear wheel brakes to a value which is just below that which will produce a sliding of the rear wheels. This is true because the loading on the rear wheels, particularly in trucks, changes and also because the coefficient of friction between the rear tires and the road surface also changes. Any structure which would attempt to take these changing conditions into consideration would be extremely complicated and expensive.

A further object of the invention is therefore the provision of a new and improved extremely simple deceleration valve which at all times prevents the rear wheels from sliding before the front wheels slide, which has substantially no time lag or hysteresis in its operation, and which provides a desirable compromise between the cost of its production and the closeness with which it allows the rear wheels to approach a slide condition.

The invention resides in certain constructions and combinations and arrangements of parts; and further objects and advantages of the invention will become apparent to those skilled in the art to which the invention relates from the following description of the preferred embodiment described with reference to the accompanying drawing forming a part of this specification, and in which:

The solitary FIGURE of the drawings is a schematic view of an automotive hydraulic braking system in which certain parts are shown in cross section.

In the drawing, there is generally shown a conventional foot pedal lever operated master cylinder A which is used to actuate a pair of front wheel brake applying wheel cylinders B and a pair of rear brake applying wheel cylinders C. Each of the front and rear wheel cylinders B and C respectively have a pair of opposing pistons, not shown, at their opposite ends and between which the hydraulic pressure is communicated to force the opposing pistons and in turn the leading and trailing shoes 10 and 12 respectively outwardly into engagement with cooperating drums 14 to apply the brakes. Any type of fluid pressure supply can be used to actuate the front and rear wheel cylinders B and C respectively; and the master cylinder A shown is of conventional construction wherein a piston 16 slides down its cylinder bore 18 to force fluid into the deceleration valve 20 which will now be described.

The deceleration valve 20 generally comprises a cast body member 22 having an axially extending cylindrical chamber 24 therein which opens outwardly of the rear end of the cast body 22 and is closed off by a threaded end closure member 26 which is screwed into the open end of the body member 22. The chamber 24 is divided into front and rear portions 28 and 30 respectively by a disc shaped partition member 32 which is sealingly clamped against a shoulder 34 in the body member 22 by means of a gasket 36 and the threaded closure member 26. The partition member 32 has an axially positioned opening 38 therethrough; and pressure from the master cylinder A is communicated to the chamber 30 on the right hand side of the partition member 32 through inlet port 40 and then passes through the opening 38 to the left hand chamber portion 28 and out through the outlet port 42 to the rear wheel brake cylinders C. The front wheel brakes are intended to be operated by direct pressure from the master cylinder, and is conveniently communicated thereto by means of an outlet port 44 in the cover member 26 which communicates with the right hand chamber 30. Pressure from the master cylinder A is therefore communicated to the front wheel brakes B in a manner controlled only by the master cylinder.

Flow to the rear wheel brakes of the vehicle is controlled by a poppet member 46 which is positioned in the right hand chamber 30 and is adapted to seat up against the annular surface surrounding the opening 38 on the right hand side of the partition member 32. Poppet member 46 includes a pin or stem 48 which extends through the opening 38 into the left hand chamber 28 where it is adapted to be contacted by a spherical ball 50 which rolls along the cylindrical sidewalls of the chamber portion 28. The poppet member 46 is biased towards its valve closing position by means of a coil spring 52; and the valve body 22 is normally installed in an inclined position, so that the force of gravity upon the ball 50 overcomes the force of the coil spring 52 and holds the poppet member 46 out of engagement with the partition member 32. Pin 48 in opening 38 is sized to restrict the flow of fluid to the rear wheel cylinder.

The poppet member 46 may be made in any convenient manner, and as shown in the drawing, is formed by a sheet metal cup 54 which is pressed upon the stem 48, and in which rubber is vulcanized or bonded around the pin 48.

As previously mentioned, the deceleration valve 20 is installed longitudinally of the vehicle with its forward end inclined upwardly so that the weight of the ball 50 normally biases the poppet 46 away from its valve seat. In general, the angle of inclination between the sidewalls of the chamber 24 and the horizontal plane determines the amount of deceleration which is necessary before the ball 50 rolls forwardly to permit the poppet member 46 to abut its valve seat; so that in any given brake system, the amount of pressure which is delivered to the rear wheel brake cylinder C will be limited to a pressure which corresponds to this rate of deceleration. In general, the steeper the angle of inclination of the supporting surfaces for the ball 59, the greater the amount of deceleration required before the ball moves to permit the poppet member 46 to close off the port 38; and conversely the shallower the angle of inclination, the lower the deceleration required for the ball to move and the poppet member 46 to close off the valve port 38. For any particular vehicle, there will be an optimum angle of inclination at which the deceleration valve 20 should be installed.

In prior art braking systems which do not have a deceleration valve, the front wheel brakes of the vehicle are made effective for a given hydraulic actuating pressure more than are the rear wheel brakes to partially correct for the weight shift that occurs during a forward brake application. One difficulty with such a fixed unequal split in braking effectiveness is that the front wheel brakes slide along before the rear wheels do on wet or icy road conditions. In applicant's preferred braking system which utilizes the deceleration valve, the front and rear wheel brakes of the vehicle are designed to provide a braking effort which is directly proportional to the normal weight distribution between the front and rear wheels of the vehicle. Under such an arrangement, the system will provide the maximum braking effort possible on snowy and icy road conditions; and will also limit the braking effort which is produced by the rear wheel brakes during good road conditions to a value just below that which will cause them to slide on dry pavement. Applicant's deceleration valve permits both the front and rear brakes to produce substantially equal braking effort up to a valve below that at which the rear wheels slide. At this point a weight shift has occurred which will allow still greater braking effort to be produced by the front wheels so that the operator can continue to increase the brake applying pressure to the front wheels without sliding the rear wheels. An angle of inclination of about 26° has been found optimum in one particular vehicle tested and approximately correct for all passenger cars and light trucks.

In normal operation of the braking system shown, the master cylinder is operated to force fluid through the ports 40, 38 and 42 to the rear wheel cylinder C while at the same time forcing fluid through outlet port 44 to the front wheel cylinders B. As the pressure to both the front and rear brake applying cylinders increases, deceleration of the vehicle increases proportionately until the deceleration or inertia force on the ball 50 causes it to roll up the sidewalls 24 of the cylinder chamber 28 to permit the poppet member 46 to close off the valve port 38. Once the poppet member 46 abuts the partition 32, no further increase in pressure can be produced in the rear wheel cylinders C. Further increase in pressure from the master cylinder A however will flow directly to the front wheel cylinders B through the port 44; so that the braking effort which is produced by the front wheel brakes can continually be increased. With the angle of the deceleration valve 20 set at approximately 26°, the poppet member 46 shuts off the valve 38 at a deceleration of about 15 ft./sec.$^2$ so that the braking effort developed by the rear wheel brakes is thereafter limited. The coefficient of friction between a rubber tire and some forms of pavement can approach a retarding force equal to the weight on the tire; so that it is theoretically possible to stop the vehicle at a deceleration rate of 32 ft./sec.$^2$ if both the front and rear wheels are braked with a force proportional to the weight on the wheel and are kept from sliding. At a deceleration of 32 ft./sec.$^2$ and for an average automobile of U.S. manufacture, a weight shift occurs so that 85% of its weight is carried on its front wheels and 15% on its rear wheels. During a a 15 ft./sec.$^2$ deceleration stop therefore, approximately 30% of the vehicle's weight is carried on the rear wheels.

Inasmuch as the retarding torque of the rear wheels during a 15 ft./sec.$^2$ deceleration would be about half that required for a 32 ft./sec.$^2$ deceleration stop at low velocities, it would require the weight on the rear wheels to fall below 25% before a slide takes place. Since at 15 ft./sec.$^2$ there is 30% of the weight on the rear wheels a safe margin exists at this point. Thereafter poppet 46 closes off port 38. Because the brake drums expand somewhat during a hard stop, a slight reduction in pressure occurs in the rear wheel cylinders which experience has shown, keeps the proportion of the braking effort done by the rear wheels below the proportion of the weight on the rear wheels. This optimum cut off in pressure to the rear wheel brakes is accomplished by varying the angle of inclination of the deceleration valve to its optimum value for each type of vehicle on which the valve is mounted. For a vehicle having the same size wheel cylinders in both the front and rear wheel brakes and a normal weight distribution of approximately 50% on its rear wheels, an angle of inclination of approximately 26° has proven optimum in most instances.

In lightly loaded vehicles and/or vehicles having generously designed brakes, the structure so far described will be adequate. In automobiles whose brakes are worked at considerably elevated temperatures, and in most truck brakes, sufficient heat will be generated to appreciably expand their brake drums. If appreciable heat is developed in the rear brake structures after the time that the poppet member 46 closes off the valve port 38, the rear brake drums expand and the pressure in the rear wheel cylinders fall below the pressure which had been delivered to the rear brakes when the poppet member abutted its valve seat. Under such conditions the braking effort achieved by the rear brakes falls below the desired value. For such installations, the deceleration valve will preferably include an expansible chamber D which will perform the function of leveling out any pressure fluctuations and compensate for the increase in fluid required by the expansion of the brake drum. In the embodiment shown in the drawing, this is accomplished by means of the transverse bore 56 which communicates with the outlet port 42, and which is provided with a shoulder 58 at its inner end adjacent the outlet port 42. A piston 62 provided with suitable seals 64 is positioned in the bore 56 and biased into engagement with the shoulder 58 by means of a coil spring 66 which in turn is held in position by means of a washer 68 and snap ring 70. The coil spring 66 is precompressed so as to hold the piston 62 against the shoulder 58 until a predetermined pressure is reached in the rear wheel cylinder C. When this predetermined pressure is exceeded, the piston 62 moves out of engagement with the shoulder 58 to compress the coil spring 66. In the preferred arrangement, the spring 66 will be so sized that the piston 62 moves out of engagement with the shoulder 58 at a pressure below that which occurs when the poppet member 46 abuts its valve seat. With this arrangement, the increase in fluid displacement which is required to hold the shoes into engagement with the drum during a stop is made up by inward movement of the piston 62. In the preferred embodiment the spring 66 will preferably be provided with a sufficient spring rate so that the movement of the piston 62 occurs over an appreciable range; and so that no sudden drop in the foot pedal lever occurs once the piston 62 moves out of engagement with the shoulder 58. A total collapse of spring 66 limits the displacement of the piston 62.

It will be apparent that the objects heretofore enumerated as well as others have been accomplished; and that there has been provided a fluid pressure braking system which will produce greater vehicle deceleration than have been possible heretofore in conventional hydraulic braking systems.

While the invention has been described in considerable detail, I do not wish to be limited to the particular con-

I claim:

1. A deceleration sensing valve for use in a hydraulic braking system having front brake and rear brake operating fluid pressure motors that are actuated by pressure from a master cylinder and the like: said deceleration sensing valve having a valve body with an internal axially extending chamber therein which extends in the normal forward line of motion of the vehicle, a partition wall across said chamber, said partition wall having an opening therethrough and a valve seat surrounding said opening on the rear side of said partition, a poppet member rearwardly of said partition and normally biased toward said valve seat, a pin extending from said poppet member through said opening into the chamber forwardly of said partition member, and a ball in said chamber forwardly of said partition member for movement toward and away from said pin, said chamber being inclined vertically in a forward direction so that the weight of said ball normally holds said poppet member off of said seat, the portion on the rear side of said valve seat having an inlet port for communication to said master cylinder, and the portion of the chamber on the front side of said partition member having an outlet port for communication to one of said front and rear brake operating fluid pressure motors.

2. In a hydraulic braking system having front brake and rear brake operating fluid pressure motors that are actuated by pressure from a master cylinder and the like: said deceleration sensing valve having a valve body with an internal axially extending chamber therein which extends in the normal forward line of motion of the vehicle, a partition wall across said chamber, said partition wall having an opening therethrough and a valve seat surrounding said opening on the rear side of said partition, a poppet member rearwardly of said partition and normally biased toward said valve seat, a pin extending from said poppet member through said opening into the chamber forwardly of said partition member, and a ball in said chamber forwardly of said partition member for movement toward and away from said pin, said chamber being inclined vertically in a forward direction so that the weight of said ball normally holds said poppet member off of said seat, the discharge pressure from said master cylinder being communicated to said front brake operating fluid pressure motors and to the rear side of said partition, and the portion of the chamber on the front side of said partition member being communicated to said rear brake operating fluid pressure motor.

3. A deceleration sensing valve for use in a fluid pressure braking system having front brake and rear brake operating fluid pressure motors that are actuated by pressure from a master cylinder and the like: said deceleration sensing valve having a valve body with an internal axially extending chamber therein which extends in the normal forward line of motion of the vehicle, a partition wall across said chamber, said partition wall having an opening therethrough and a valve seat surrounding said opening on the rear side of said partition, a poppet member rearwardly of said partition and having a guide pin extending through said opening into the chamber forwardly of said partition member, a spring biasing said poppet member against said valve seat, and a ball in said chamber forwardly of said partition member for movement toward and away from said pin, said chamber being inclined vertically in a forward direction so the weight of said ball normally holds said poppet member off of said seat, the portion of said chamber on the rear side of said valve seat having an inlet port for communication to said master cylinder, and the portion of the chamber on the front side of said partition member having an outlet port for communication to said rear brake operating fluid pressure motor.

4. A deceleration sensing valve for use in a fluid pressure braking system having front brake and rear brake operating fluid pressure motors that are actuated by pressure from a master cylinder and the like: said deceleration sensing valve having a valve body with an internal axially extending chamber therein which extends in the normal forward line of motion of the vehicle, a partition wall across said chamber, said partition wall having an opening therethrough and a valve seat surrounding said opening on the rear side of said partition, a poppet member rearwardly of said partition and normally biased toward said valve seat, a pin extending from said poppet member through said opening into the chamber forwardly of said partition member, and a ball in said chamber forwardly of said partition member for movement toward and away from said pin, said chamber being inclined vertically in a forward direction so that the weight of said ball normally holds said poppet member off of said seat, the portion on the rear side of said valve seat having an inlet port for communication to said master cylinder, the portion of the chamber on the front side of said partition member having an outlet port for communication to said rear brake operating fluid pressure motor, said valve body also having an expansible chamber communicated to said outlet port and closed off by a movable wall, abutment means limiting the chamber collapsing movement of said movable wall, and means biasing said movable wall to the stopped position established by said abutment means with predetermined force.

References Cited in the file of this patent

UNITED STATES PATENTS

| | | |
|---|---|---|
| 1,648,864 | Pugh | Nov. 8, 1927 |
| 2,242,297 | Freeman | May 20, 1941 |